United States Patent [19]

Underhill

[11] Patent Number: 5,799,466
[45] Date of Patent: Sep. 1, 1998

[54] UNIVERSAL BALE WRAPPER AND ACCUMULATOR

[76] Inventor: Kenneth R. Underhill, 219 Miller St., Strasburg, Pa. 17579

[21] Appl. No.: 766,067

[22] Filed: Dec. 16, 1996

Related U.S. Application Data

[60] Provisional application No. 60/009,342 Dec. 27, 1995.
[51] Int. Cl.$^6$ ............... B65B 53/00; B65B 11/58; B65B 13/04
[52] U.S. Cl. ............... 53/399; 53/441; 53/449; 53/556; 53/176; 53/587
[58] Field of Search ............... 53/399, 441, 461, 53/465, 556, 176, 587, 593, 211, 541

[56] References Cited

U.S. PATENT DOCUMENTS

| | | | |
|---|---|---|---|
| 4,343,132 | 8/1982 | Lawless | 53/399 |
| 4,461,136 | 7/1984 | Hudson et al. | 53/587 X |
| 4,563,857 | 1/1986 | Bergling et al. | 53/587 X |
| 4,730,436 | 3/1988 | Angelino | 53/556 X |
| 4,821,489 | 4/1989 | MacLeod et al. | 53/587 X |
| 5,038,549 | 8/1991 | Nordstrom | 53/541 X |
| 5,224,323 | 7/1993 | Fykse | 53/211 |

FOREIGN PATENT DOCUMENTS

| | | | |
|---|---|---|---|
| 2275037 | 8/1994 | United Kingdom | 53/211 |

*Primary Examiner*—Linda Johnson

[57] ABSTRACT

A machine and method of operation thereof to pick-up individual bales of hay or other forage material from the field to create a package of individual bales that is silage-wrapped with plastic before being discharged back to the ground. The receiving table is pivotally supported on the frame of the machine to provide the ability to re-orient the package for wrapping plastic about orthogonal axes. A clamping and elevating mechanism is operable to lift layers of individual bales to permit the formation of subsequent layers therebeneath until the desired package size has been completed. The clamping members are rotatably mounted to allow rotation of the elevated package for wrapping plastic around the periphery thereof. Ejection of the wrapped package is accomplished by pivoting the telescopic members mounting the clamping members to a horizontal orientation and releasing the package. The reversal of the discharge process can be utilized to retrieve wrapped packages from the field.

24 Claims, 11 Drawing Sheets

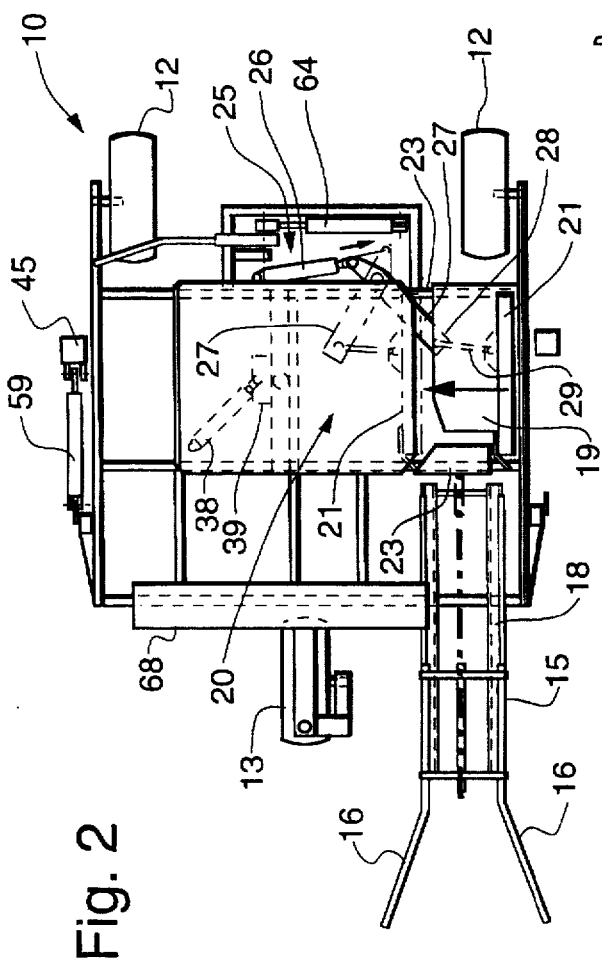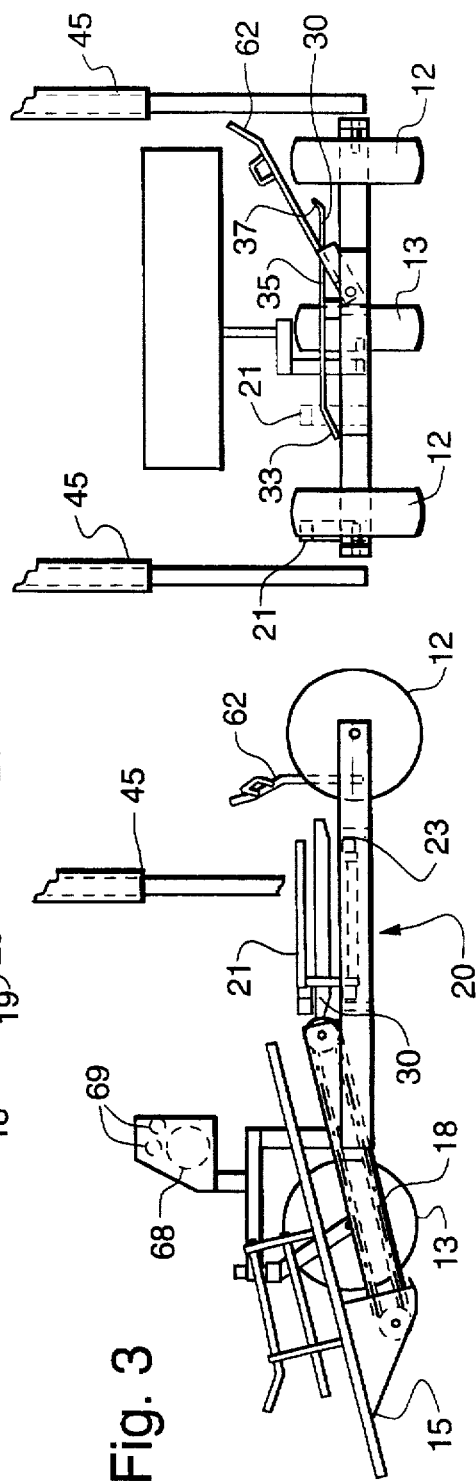

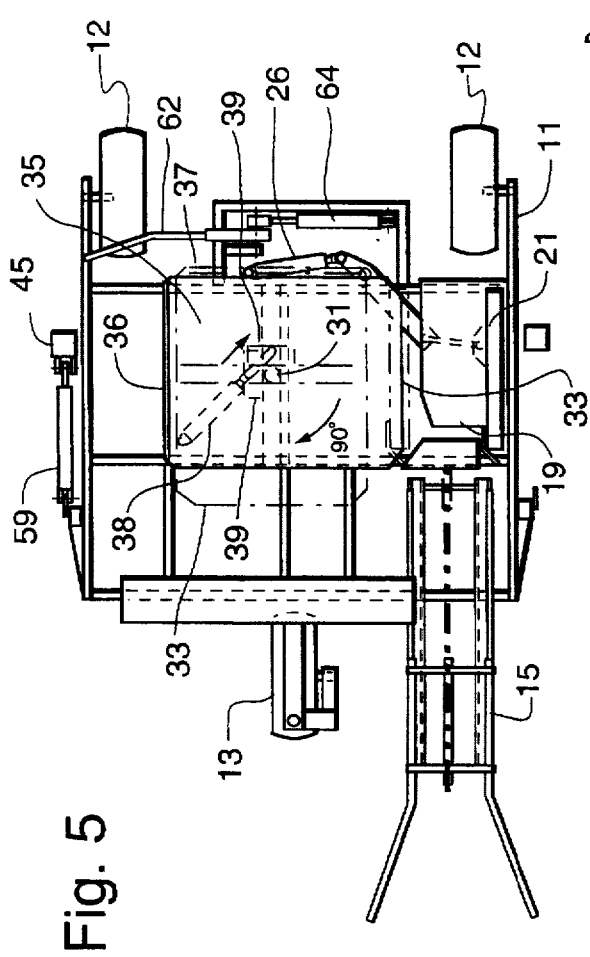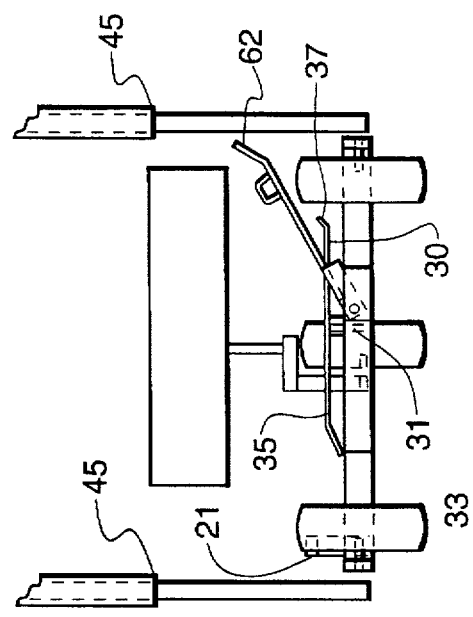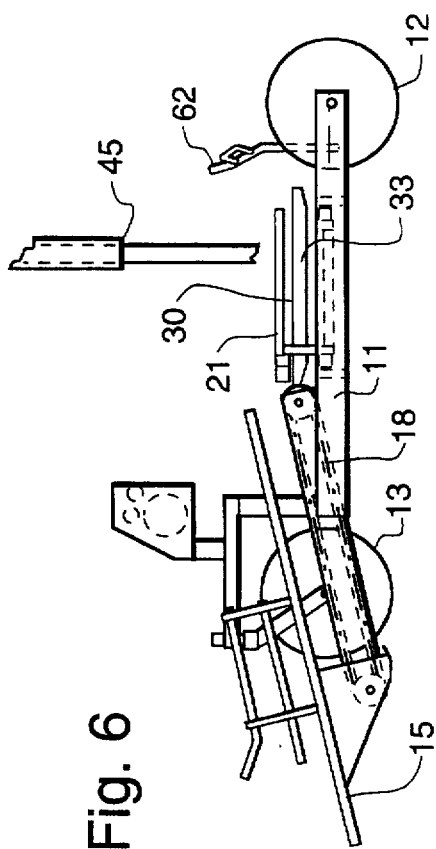

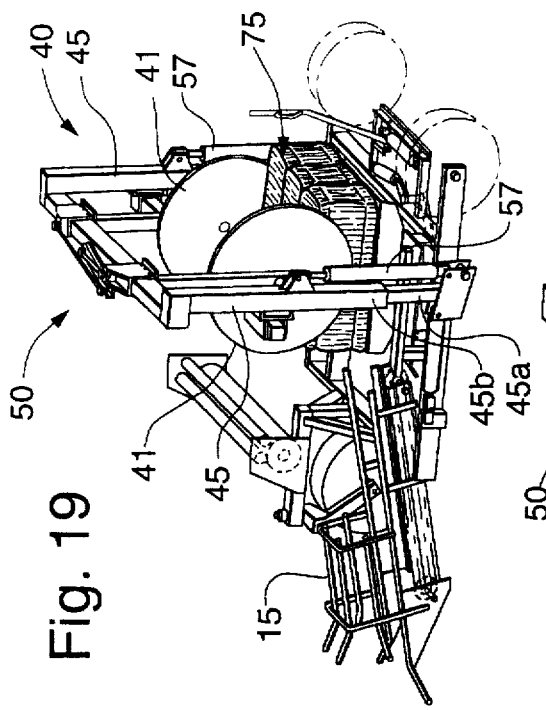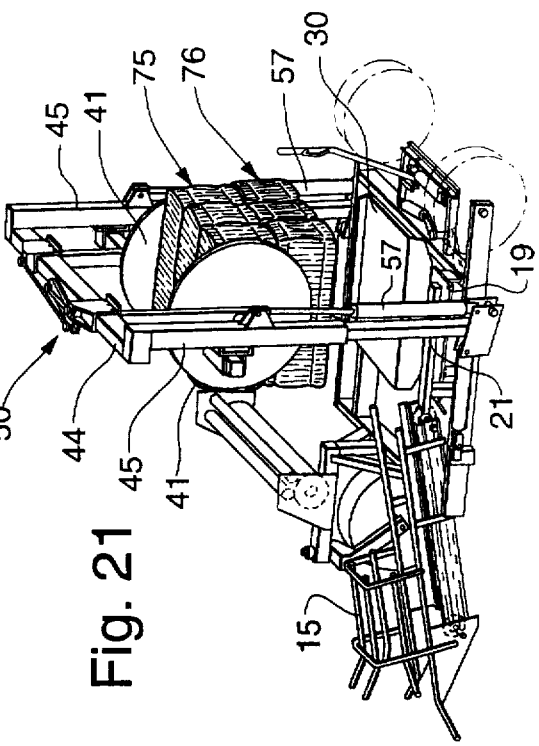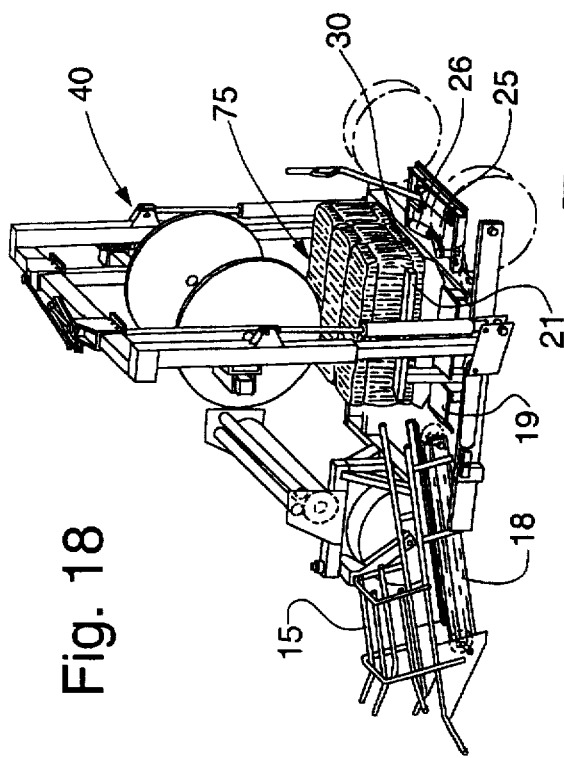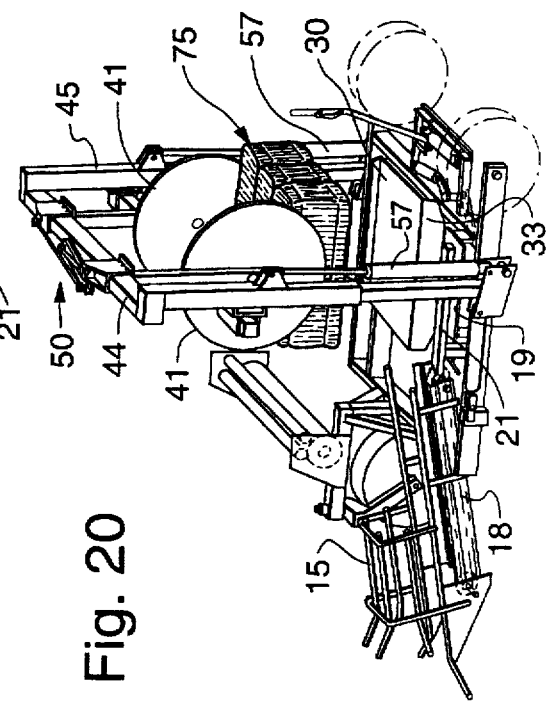

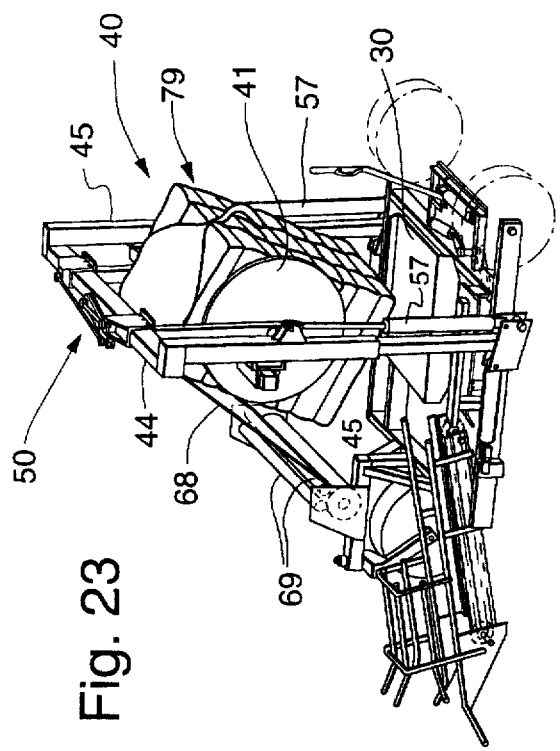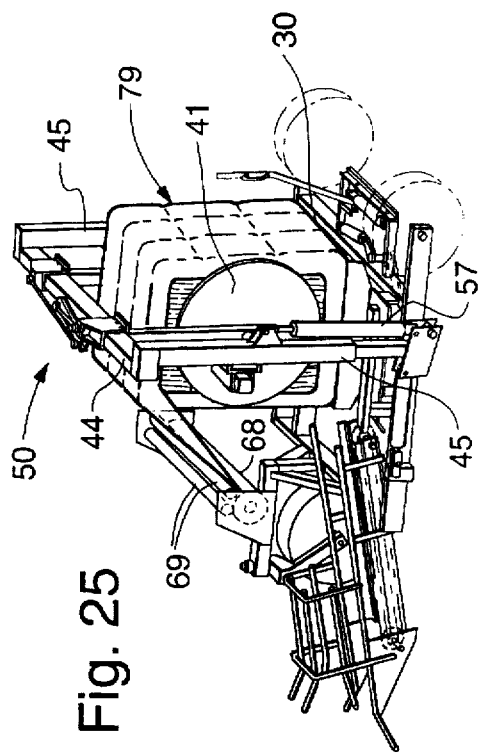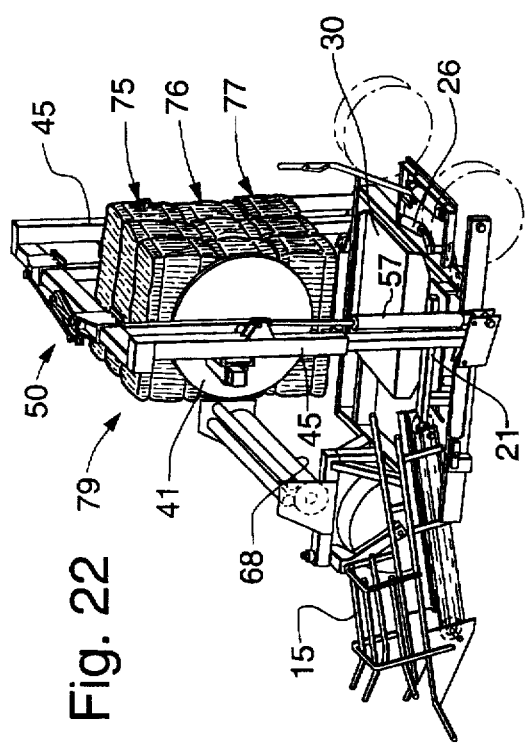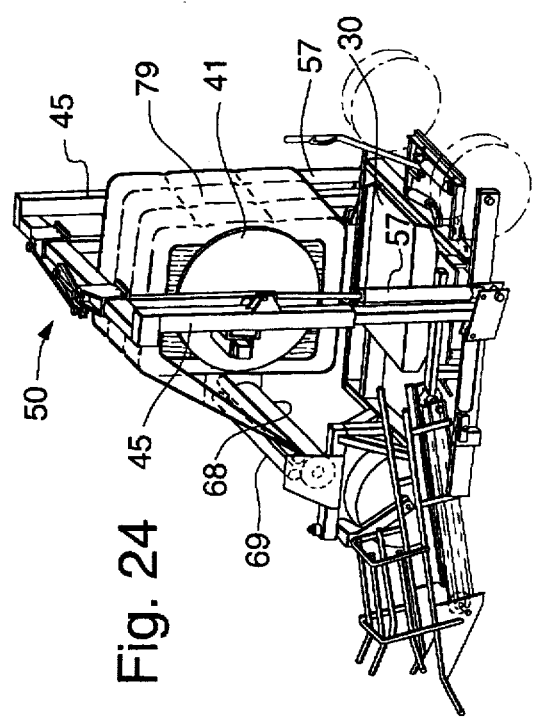

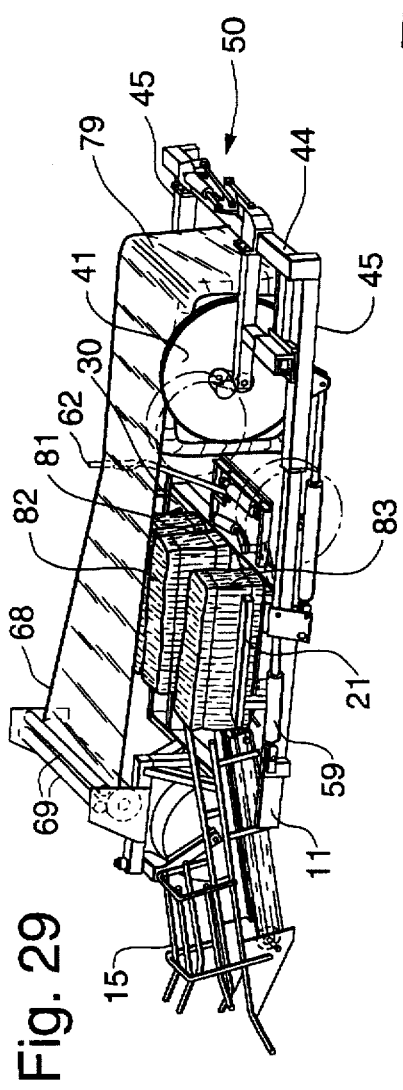
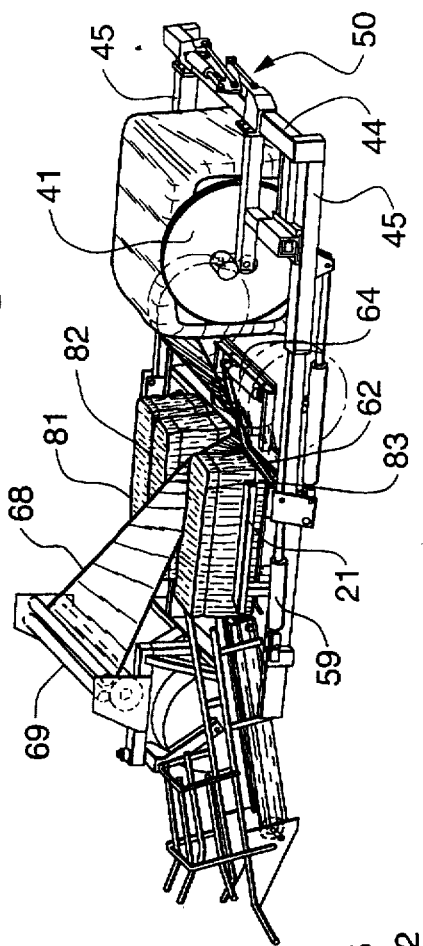
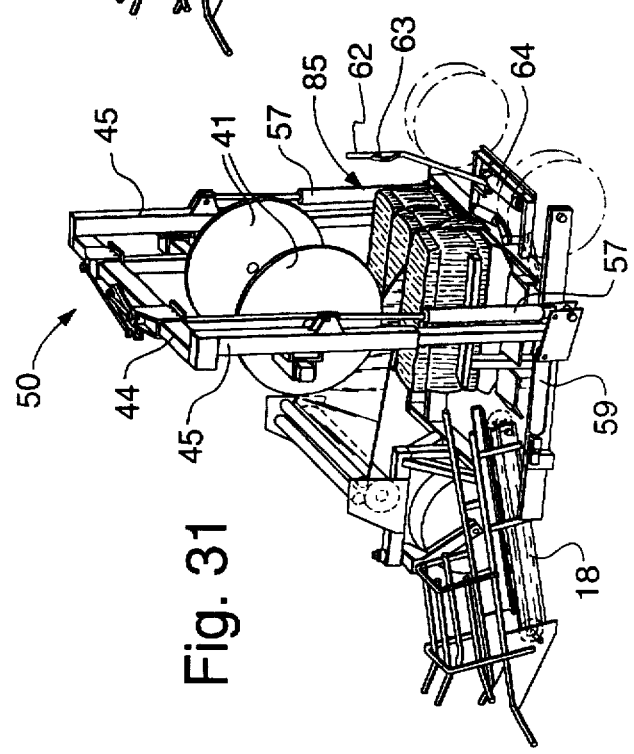
Fig. 29
Fig. 30
Fig. 31

UNIVERSAL BALE WRAPPER AND ACCUMULATOR

This application claims benefit of USC Provisional Application No. 60/009,342, filed Dec. 27, 1995.

BACKGROUND OF THE INVENTION

This invention relates generally to a machine for gathering and wrapping bales of forage material, such as hay, to create silage therewithin. The invention relates specifically to a machine for silage wrapping small rectangular bales of hay accumulated into a small cube-shaped grouping.

As a matter of definition, hay and other forage crops are typically packaged by machines commonly referred to as balers into a bale having a predetermined size and shape. A round bale is typically formed as a cylindrical shape having both a diameter and a length of 4 to 6 feet and weighing 1000 to 1500 pounds. Rectangular balers package hay into rectangular packages. Large rectangular bales have a weight similar to round bales, but come in a rectangular shape that can be 8 feet long, 4 feet high and 4 feet wide. Medium-sized rectangular bales are somewhat smaller than large rectangular bales and typically have a crosssection measuring 2 feet by 3 feet. Conventional small rectangular bales have many different sizes, usually measured in inches, instead of feet. A typical small rectangular bale can have a cross section of 14 inches by 18 inches and a length of 30–36 inches.

Many types of round bale silage wrappers and small square bale accumulators are currently available and offered to the public for sale. Each of these known machines is designed to perform a specific task. The only function of the round bale silage wrapper is to silage wrap plastic around round bales of hay and the sole function of the small square bale accumulator is to accumulate and stack small rectangular bales of hay. Furthermore, bale wagons, which travel over a field of baled hay to pick up the bales from the field and accumulate them into a stack, are also commercially available to farmers.

It is well known that in areas where large amounts of precipitation occurs, drying hay for baling is nearly impossible, making the hay crop subject to rain damage from inclement weather. While known silage wrapper mechanisms are not operable to silage wrap small, medium or large square bales, commercial haulers prefer the rectangular shape to maximize loads for transportation. The handling of small square bales is typically a labor intensive operation, requiring the bales to be transported from the field and placed under roof in a barn or other structure, particularly in high moisture climate areas, to protect the hay from rain damage and other inclement weather.

Round bale wrapping machines are not inexpensive and small farmers experience difficulty justifying the financial expenditure required to acquire such machines. Furthermore, since round balers tightly rope uncut hay into a substantially continuous spiraled package, feeding the hay from a round bale to livestock has inherent problems, generally relating to tearing the round bale of hay apart. Hay packaged in conventional round bales is also unacceptable for further processing in a Total Mix Ration (TMR) Mixer, which require hay to be cut into lengths of approximately 2 to 8 inches. Unless the barn is specifically mechanized to handle the substantial weight and bulk of round bales, round bales are extremely unmanageable inside the barn and also present handling problems outside the barn, particularly on hillsides.

To date, a single machine operable to pick rectangular bales of hay from the field, accumulate them into a small stack or cube, and then silage wrap the accumulated stack of bales with plastic, has not been provided. Such a machine would greatly improve the ability of farmers to feed silage hay to livestock in the barn and lower the cost of machinery required to create silage hay. Such a machine would also provide the advantages of preventing crop loss from rain damage, provide a silage hay that is compatible with conventional feed mixers, allow an easier handling of silage bales inside the barn, and improve the commercial hauling of silage hay bales.

The value of such a machine would be particularly enhanced if the apparatus could be adapted to handle the different sized packages of hay or forage bales, including round bales, large and medium-sized rectangular bales and the traditional small rectangular bales, sometimes referred to small square bales. Furthermore, the machine could function as a bale accumulator, picking bales off the ground and arranging the gathered bales into a cube-shaped stack to be deposited at a convenient location for subsequent retrieval. Whether the accumulated stack of bales remains unwrapped, is partially wrapped with plastic, or is completely silage wrapped with plastic, a conventional tractor-mounted round bale squeeze attachment can be used to transport the accumulated stack.

SUMMARY OF THE INVENTION

It is an object of this invention to overcome the disadvantages of the prior art by providing a machine operable to pick-up bales of hay from the field, stack the bales into a predetermined package shape and size, and then wrap the package with plastic before discharging the wrapped package to the field.

It is another object of this invention to provide a method of making silage from individual bales of hay.

It is a feature of this invention that silage is created from individual bales of hay that are packaged together and wrapped as a unitary bundle.

It is an advantage of this invention that the individual bales of hay that are turned into silage can still be handled for feeding to animals without requiring mechanization.

It is still another object of this invention to provide a mechanism for building a stack of individual bales of hay to create a package that can be wrapped with plastic to create silage.

It is another feature of this invention that the mechanism for building a stack of individual bales is operable to elevate previously constructed layers of bales to permit the construction of a subsequent layer of bales immediately beneath the elevated layers of bales.

It is another advantage of this invention that a cube-like package of individual bales of hay can be formed on a receiving table.

It is yet another object of this invention to provide a mechanism and method for wrapping the constructed package of individual bales formed on the receiving table.

It is still another feature of this invention to elevate the entire package of individual bales above the receiving table by a clamping apparatus that is operable to permit rotation of the elevated package.

It is still another advantage of this invention that the package of individual bales of hay is rotated about two orthogonal axes of rotation to permit the entire package to be silage wrapped with plastic.

It is yet another feature of this invention that the package of individual bales of hay can be lowered onto the receiving table to be rotated approximately 90 degrees to permit rotation of the subsequently elevated package about an axis of rotation that is perpendicular to the previous axis of rotation.

It is yet another object of this invention to provide a method of wrapping a package of forage material while being suspended.

It is yet another feature of this invention that the package of forage material is wrapped with plastic while being suspended above a receiving table and rotated about a generally horizontal axis of rotation.

It is yet another advantage of this invention that the package of forage material does not bounce on a receiving table while being wrapped.

It is a further object of this invention to provide a mechanism for discharging the wrapped package of individual bales from a position elevated above the receiving table to the ground.

It is still another advantage of this invention that damage to the plastic wrapping of a package of forage material is minimized by the gentle discharge of the wrapped package to the ground.

It is a further feature of this invention to partially form a layer of bales beneath a completely wrapped package of individual bales prior to discharging the wrapped package to the ground.

It is yet another advantage of this invention to trap the uncut span of plastic, extending between the wrapped package and the supply roll of plastic, between bales of hay positioned on the receiving table prior to severing the plastic from the wrapped plastic so as to fix the plastic into the next package to be formed on the receiving table.

It is still a further feature of this invention that the clamping members are operable to engage the plastic-wrapped sides of the elevated package without damaging the plastic to disrupt the sealing of the package within the plastic.

It is a further advantage of this invention that the clamping members have a round configuration to provide a universally applicable mechanism that is not dependent on the shape of the package of forage material being wrapped.

It is still a further object of this invention to provide a universal bale wrapping machine that can also be utilized to retrieve the wrapped packages of individual bales from the field.

It is yet a further feature of this invention that the reversal of the discharge procedure can be effective to retrieve wrapped packages from the field for transport to remote locations.

It is a further advantage of this invention that additional equipment is not required in order to pick-up and transport wrapped packages of individual bales.

It is still a further object of this invention to provide a machine and method of operation that is adaptable to silage wrap a plurality of other package formations.

It is yet another feature of this invention that the package of hay to be silage wrapped can be a single round bale.

It is yet a further feature of this invention that a silage wrapping of the package of forage material by the method and apparatus disclosed herein has only two seams through which air can leak.

It is still a further advantage of this invention that the utilization of stretch plastic to wrap a package of forage material according to the disclosed method will extend the edges of the plastic around the corners of the package to provide a better seal for silage wrapping.

It is still another object of this invention to provide an apparatus for wrapping a package of accumulated rectangular bales of hay that can be mounted directly to a hay baler to receive bales therefrom without being discharged to the ground.

It is yet a further object of this invention to provide a machine for silage wrapping a package of forage material, which is durable in construction, inexpensive of manufacture, carefree of maintenance, facile in assemblage, and simple and effective in use.

These and other objects, features, and advantages are accomplished according to the instant invention by providing a machine and method of operation thereof to pick-up individual bales of hay or other forage material from the field to create a package of individual bales that is silage-wrapped with plastic before being discharged back to the ground. The receiving table is pivotally supported on the frame of the machine to provide the ability to re-orient the package for wrapping plastic about orthogonal axes. A clamping and elevating mechanism is operable to lift layers of individual bales to permit the formation of subsequent layers therebeneath until the desired package size has been completed. The clamping members are rotatably mounted to allow rotation of the elevated package for wrapping plastic around the periphery thereof. Ejection of the wrapped package is accomplished by pivoting the telescopic members mounting the clamping members to a horizontal orientation and releasing the package. The reversal of the discharge process can be utilized to retrieve wrapped packages from the field.

BRIEF DESCRIPTION OF THE DRAWINGS

The inventions disclosed herein will be best understood with reference to the attached drawings, including:

FIG. 2 is a schematic top plan view of a portion of the machine shown in FIG. 1 to depict the bale transfer linkage operable to move a small rectangular bale from the bale pickup mechanism onto the table, the movement of the linkage being shown in heavy phantom lines;

FIG. 3 is a schematic left side elevational view of portions of the machine depicting the pickup mechanism and the bale transfer mechanism shown in FIG. 2;

FIG. 4 is a schematic rear elevational view of portions of the machine depicting the movement of the bale transfer mechanism shown in FIG. 2 with heavy phantom lines;

FIG. 5 is a schematic top plan view of a portion of the machine shown in FIG. 1 to depict the rotational table operable during the wrapping operation effect a silage wrapping of the accumulated stack of bales, the rotated position of the table being shown in heavy phantom lines;

FIG. 6 is a schematic left side elevational view of portions of the machine shown in FIG. 5;

FIG. 7 is a schematic rear elevational view of portions of the machine depicting the table in a normal operative position to receive bales from the pickup mechanism through operation of the bale transfer mechanism;

FIG. 14 through FIG. 31 are schematic left rear perspective views of the machine sequentially demonstrating the operation of the machine from the pickup of the first bale through the discharge of the first silage wrapped stack of bales with the machine readied to continue with the accumulation of the second stack of bales.

DESCRIPTION OF THE INVENTIONS

Figure 1:
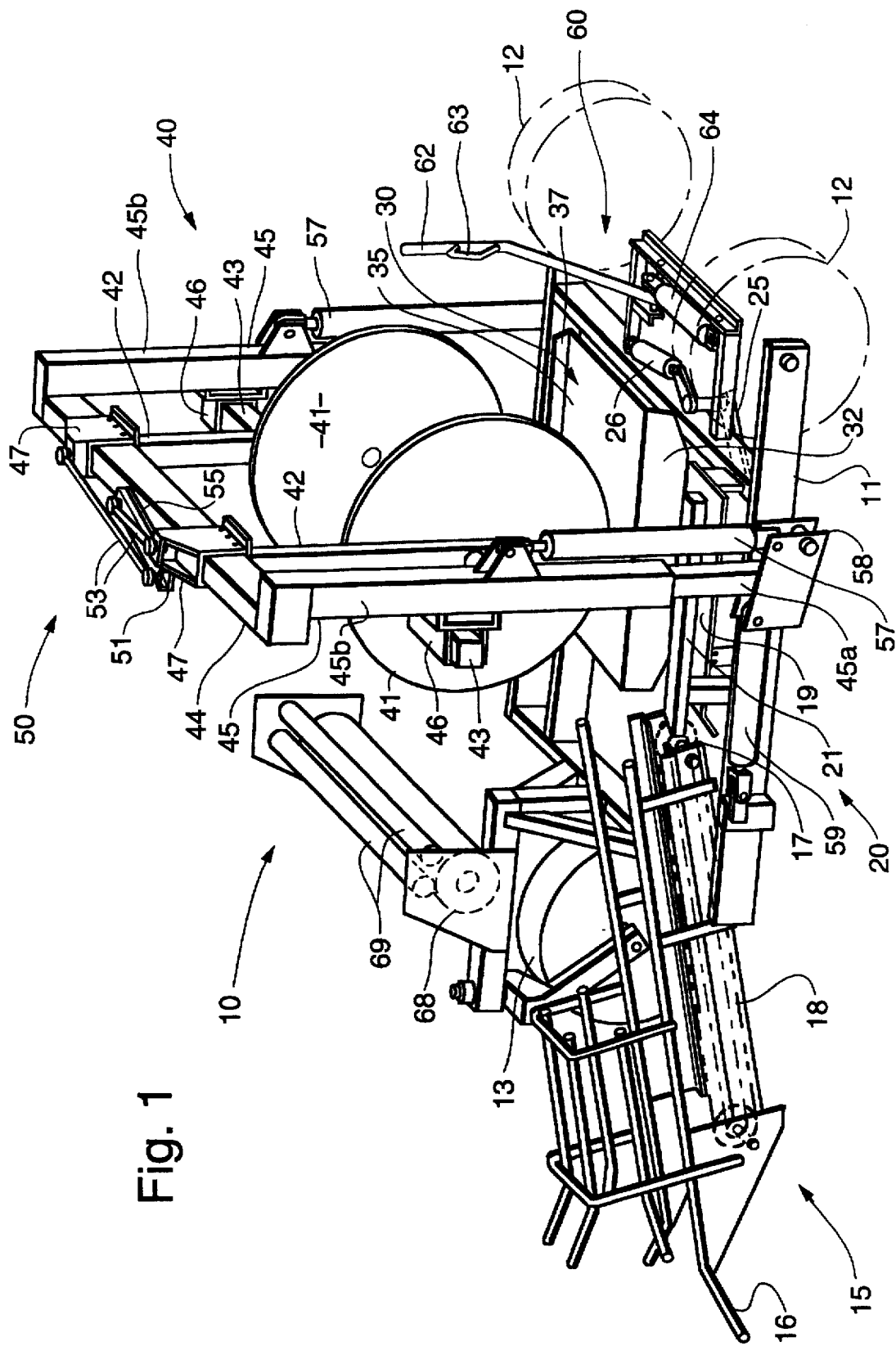
FIG. 1 is a schematic, left rear perspective view of the machine with certain frame members and other graphic liberties being taken to clarify the disclosures of the inventions.

Referring first to FIG. 1, a machine 10 for retrieving small rectangular bales of hay from the field, accumulating the bales into a cube-shaped stack and wrapping the bales with plastic can best be seen. The machine 10 is provided with a frame 11 mobilely supported over the ground by wheels 12, preferably including a front castor wheel 13. A appropriate draft tongue (not shown) is pivotally connected to the from 11 in a conventional manner to extend forwardly of the frame 11 for connection to a primary mover, such as a tractor (not shown) which will provide transportation power to move the machine 10 over the field and hydraulic power to operate the hydraulic functions of the machine 10 as described in greater detail below.

The machine 10 is towed over the field by the tractor (not shown) to which the draft tongue (not shown) is connected to engage small rectangular bales of hay thereon with the pickup mechanism 15. The pickup mechanism 15 is similar to that found on conventional bale wagons in that guide members 16 direct the bale endwise into an opening where the bale engages a conveyor 18, driven by a hydraulic motor 17, that elevates the bale off the field and transports the bale rearwardly onto a bale receiving platform 19. Preferably, the machine 10 will carry a sensor (not shown) that signals the presence of a bale on the bale receiving platform 19 to initiate the operation of the bale transfer mechanism 20 to move the bale laterally onto the table 30. In lieu of an automated mechanism, including appropriate sensors, the operator must control the individual hydraulic operations manually.

The bale transfer mechanism 20 is best seen in FIGS. 2–4 and includes a fore-and-aft extending push bar 21 carried by channels 23 supported by the frame 11 to control the lateral motion of the push bar 21 moving bales from the bale receiving platform 19 onto the table 30. A bale transfer linkage 25 effects movement of the push bar 21. The linkage 25 includes a hydraulic cylinder 26, operably powered through the hydraulic circuit 65, as described in greater detail below, that is pivotally anchored to the frame 11 and pinned to a pivot link 27 which is pivotally supported on the frame 11. A push/pull link 29 interconnects the distal end 28 of the pivot link 27 and the push bar 21 to transfer pivotal motion of the pivot link 27 to effect lateral motion of the push bar 21.

In operation, the extension of the hydraulic cylinder 26 causes a pivotal motion of the pivot link 27 to move the distal end 28 thereof toward the opposing side of the machine 10, thereby drawing the push bar 21 laterally inwardly to transfer the bale on the bale receiving platform 19 onto the table 30. The subsequent retraction of the hydraulic cylinder 26 reverses the pivotal motion of the pivot link 27 and returns the push bar 21 back into its rest position so that the pickup mechanism 15 can deliver another bale onto bale receiving platform 19. Subsequent cycling of the extension and contraction of the hydraulic cylinder 26 will sequentially transfer additional bales laterally onto the table 30 until the table is filled.

As best seen in FIGS. 5–7, the table 30 is journaled on the frame 11 by a generally vertical pivot 31 to enable the table 30 to rotate in a generally horizontal plane. The table 30 is shaped to facilitate the transfer of bales from the bale receiving platform 19 by the bale transfer mechanism 20, including a ramp portion 33 to deflect bales upwardly onto the main table portion 35. A longitudinally extending lip 37 serves to retain the bales on the main table portion 35 and could incorporate an appropriate sensor (not shown) that would signal the filling of the main table portion 35. A hydraulic cylinder 38 is pivotally anchored to the frame 11 and is pinned to a connecting arm 39 fixed to the table 30 such that an extension of the hydraulic cylinder 38 effects a rotation of the table 30 through a rotation of approximately 90 degrees, as depicted in heavy phantom lines in FIG. 5.

Figure 9:
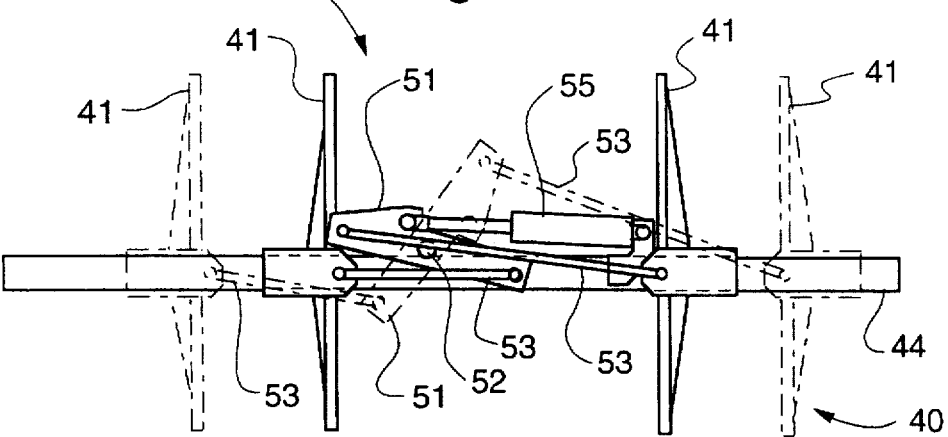
FIG. 9 is a schematic top plan view of the bale clamping mechanism shown in FIG. 8 to depict the overcenter linkage operable with a single actuating cylinder to effect movement of the bale clamping mechanism.
Figure 8:
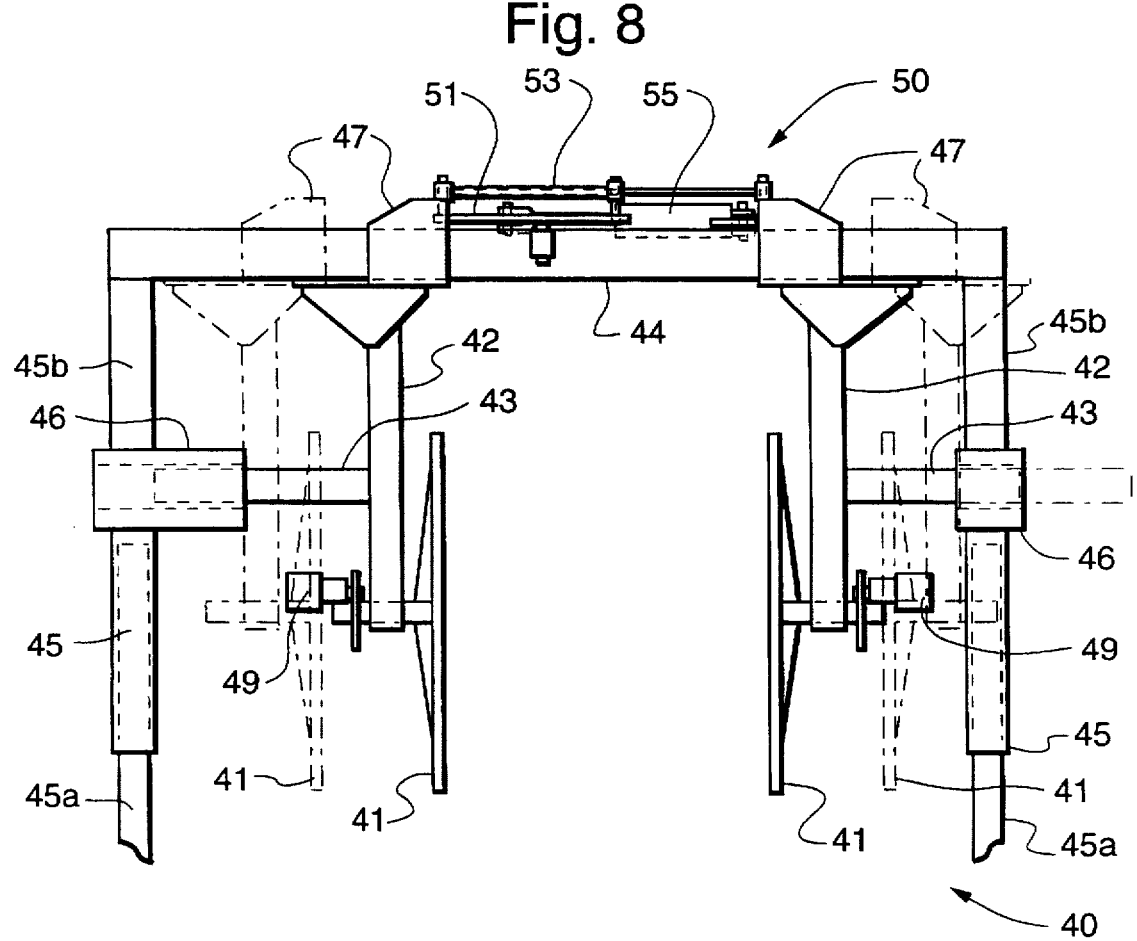
FIG. 8 is a schematic rear elevational view of a portion of the machine shown in FIG. 1 to depict the bale clamping mechanism positioned above the table, the movement of the bale clamping mechanism being shown in phantom and solid lines.
Figure 10:
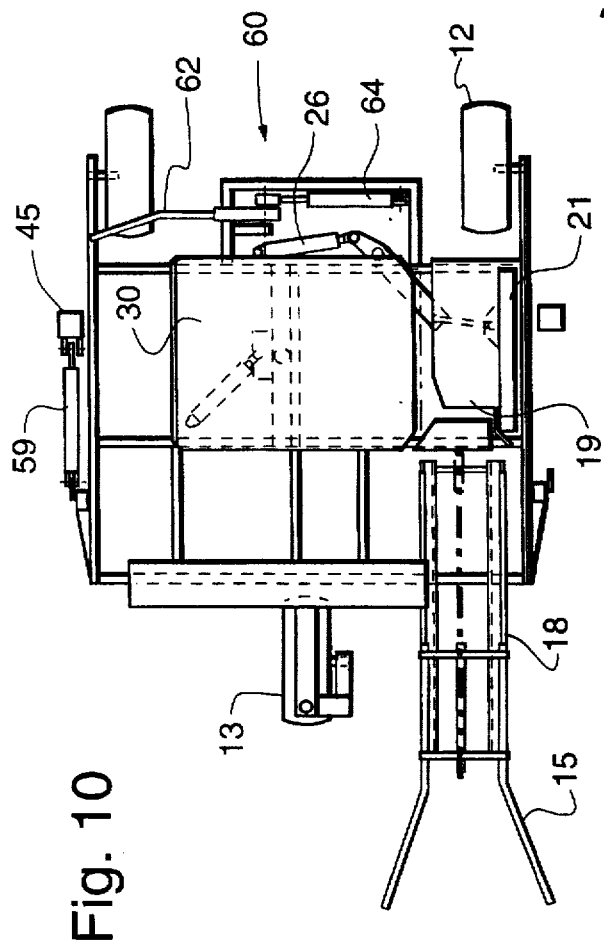
FIG. 10 is a schematic top plan view of a portion of the machine shown in FIG. 1 to depict the wrap restart arm mechanism operable during the wrapping operation to capture the plastic tailing between bales for the next wrapping operation.
Figure 11:
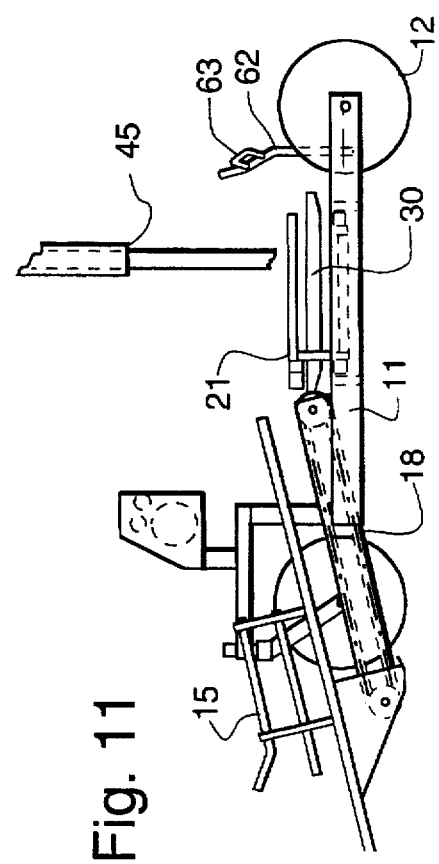
FIG. 11 is a schematic left side elevational view of portions of the machine depicting the wrap restart arm mechanism shown in FIG. 10.

Once the table 30 has been filled with bales transferred from the bale receiving table 19 by the bale transfer mechanism 20, a bale clamping mechanism 40, best seen in FIGS. 8 and 9, engages the lateral sides of the layer of bales setting on the table 30 and elevates the layer of bales above the table 30 so that a subsequent layer of bales can be formed on the table 30. The bale clamping mechanism 40 includes a pair of laterally opposed, round clamping disks 41 rotatably supported from vertical support arms 42 that depend downwardly from a horizontal cross beam 44. A pair of laterally opposing, telescopic support members 45 interconnect the horizontal cross beam 44 for support thereof vertically above the table 30. The telescopic support members 45 are provided with horizontally oriented slide supports 46 for slidably supporting horizontally extending slide members 43 affixed to the vertical support arms 42.

Rotation of the clamping disks 41 is powered by hydraulic motors 49 operatively connected, respectively, to the clamping disks 41 and being laterally movable therewith. Preferably, the clamping disks 41 are round to prevent the necessity of aligning rectangularly shaped clamping members with the corners of the package of bales being wrapped, as improper alignment could result in the corners of a rectangular disk extending beyond the edges of the plastic and a corresponding interference in the wrapping a plastic around the package.

The vertical support arms 42 are affixed to slide collars 47 slidably mounted on the cross beam 44 for horizontal movement thereon. An overcenter linkage 50 is supported above the cross beam 44 to control the horizontal, lateral movement of the sliding collars 47 and, consequently, the lateral movement of the clamping disks 41. The overcenter linkage 50 includes a pivoted member 51 pivotally journaled on the cross beam 44 for rotational movement in a generally horizontal plane extending parallel to the orientation of the cross beam 44 by a pivot 52. A pair of connecting links 53 extend from the opposing ends of the pivoted member 51 to respective slide collars 47. A hydraulic cylinder 55 is anchored on the cross beam 44 and is pinned to the pivoted member 51 to effect rotation of the pivoted member 51 upon extension and contraction of the hydraulic cylinder 55.

In operation, extension of the hydraulic cylinder 55 effects a rotation of the pivoted member 51 to slide the clamping disks 41 inwardly toward one another. Once the clamping discs 41 have reached a position that engages the bales on the table 30, as shown in solid lines in FIG. 9, both of the connecting links 53 are positioned on the same side of the pivot 52, thus placing the linkage 50 in an overcenter condition. Accordingly, a hydraulic failure in the situation, where the bale clamping mechanism 40 has a number of bales elevated above the table 30, would not result in the disengagement of the clamping disks 41 from the bales. A contraction of the hydraulic cylinder 55 pulls the linkage 50 out of the overcenter condition and slides the clamping disks outwardly away from one another to release the bales therebetween.

Referring again to FIG. 1, the telescopic movement of the telescoping portion 45b of the support members 45 is actuated by corresponding hydraulic cylinders 57 anchored on a bracket 58 affixed to the base portion 45a of the members 45. Extension and contraction of the hydraulic cylinders 57 cause a corresponding raising and lowering of the clamping members for operation as described in greater detail below. The brackets 58 and affixed base portions 45a are pivotally connected to the frame 11 to permit movement of the support members 45 and interconnected cross beam 44 between an upright position, as shown in FIG. 1 to a lowered position rearward of the table 30, as shown in FIG. 29 for purposes described in greater detail below. A pair of laterally spaced hydraulic cylinders 59 are anchored to the frame 11 and are pinned to the corresponding brackets 58 to effect the pivotal movement of cross beam 44 between the aforementioned elevated and lowered positions.

Figure 12:
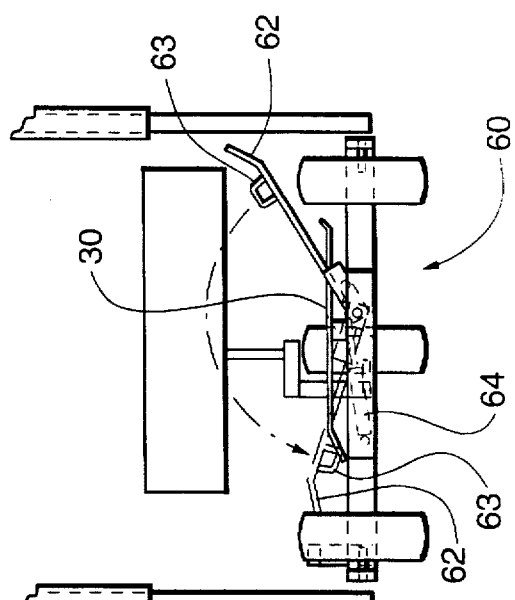
FIG. 12 is a schematic rear elevational view of portions of the machine depicting the movement of the wrap restart arm mechanism shown in FIG. 10 with heavy phantom lines.

The plastic for wrapping the bales on the table 30 is obtained from a supply formed as a roll 68 journaled for rotation forwardly of and elevated above the table 30. A pair of tensioning rollers 69 engage the roll of plastic to restrict casual movement thereof and to maintain tension on the plastic during the wrapping process, as will be described in greater detail below. A wrap restart arm mechanism 60 is positioned behind the table 30 to facilitate the second and subsequent wrapping of stacks of bales in a manner described in greater detail below. The wrap restart arm mechanism 60 includes a restart arm 62 pivotally supported on the frame 11 for movement in a generally laterally extending plane as best seen in FIG. 12. A hydraulic cylinder 64 anchored on the frame 11 and pinned to the restart arm 62 effects movement, upon extension and contraction thereof, of the restart arm 62 between a normal rest position, shown in solid lines in FIG. 12, and an operative position shown in heavy phantom lines in FIG. 12.

Figure 13:
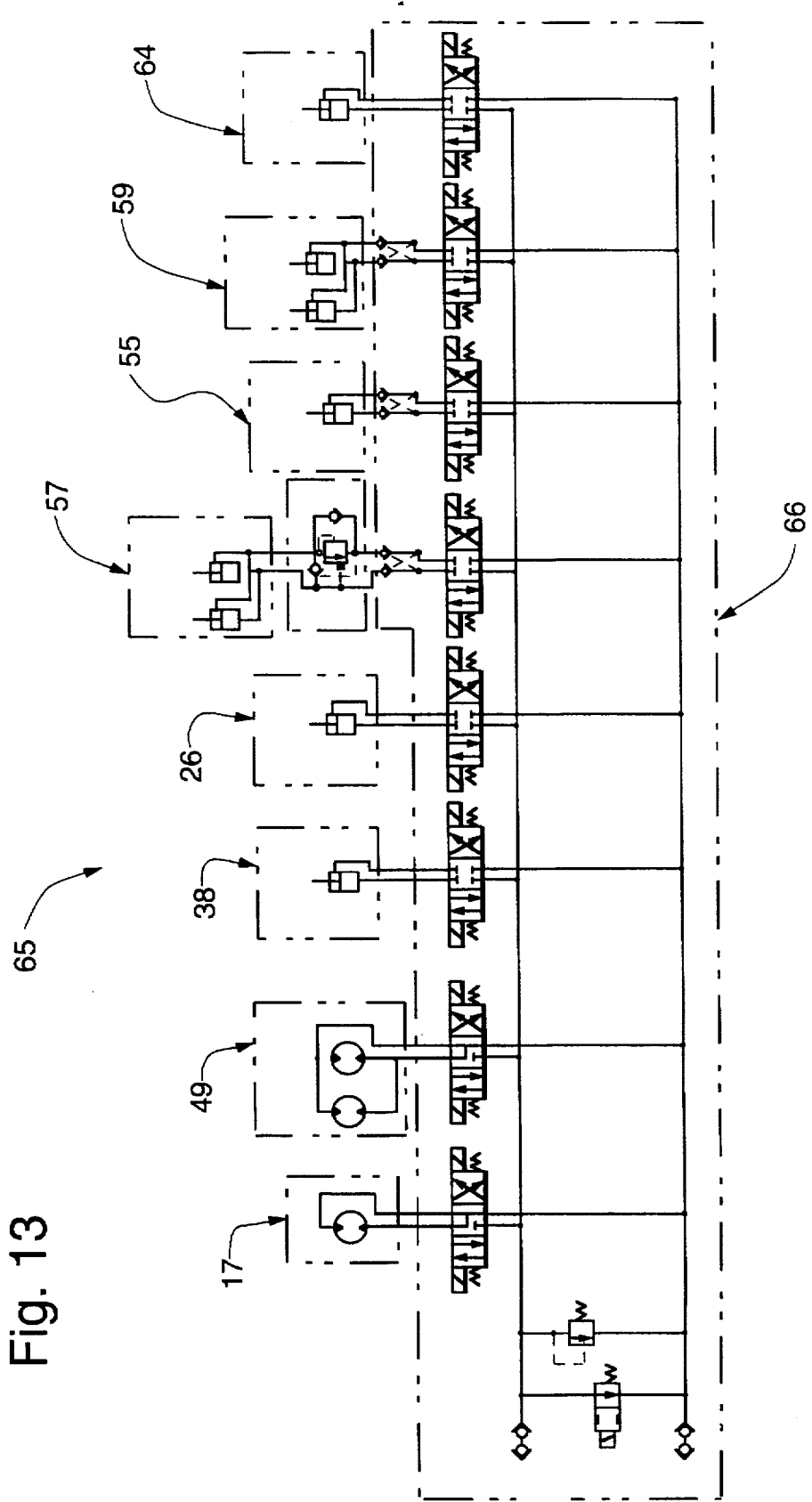
FIG. 13 is a schematic diagram of the hydraulic circuit providing operative power for the functions of the machine depicted in FIG. 14 thorough FIG. 31.

The hydraulic circuit 65 is best seen in FIG. 13 and consists of a control valve 66 connectable to the source of hydraulic power carried by the tractor (not shown) to provide a supply of hydraulic fluid under pressure to the circuit 65. Each hydraulic component 17, 26, 38, 49, 55, 57, 59 and 64 on the machine 10 is connected in parallel to the control valve 66. Since only a few of the hydraulic components will be operated at any given point in time, the entire hydraulic circuit 65 can be operated from a tractor hydraulic system that produces a maximum flow rate of 10 gallons per minute. As noted above, each spool valve controlling a corresponding hydraulic component 17, 26, 38, 49, 55, 57, 59 and 64 is manually operable; however, a control system, including appropriate sensors, can be devised to automate at least some of the operations to be described in greater detail below.

Figure 14:
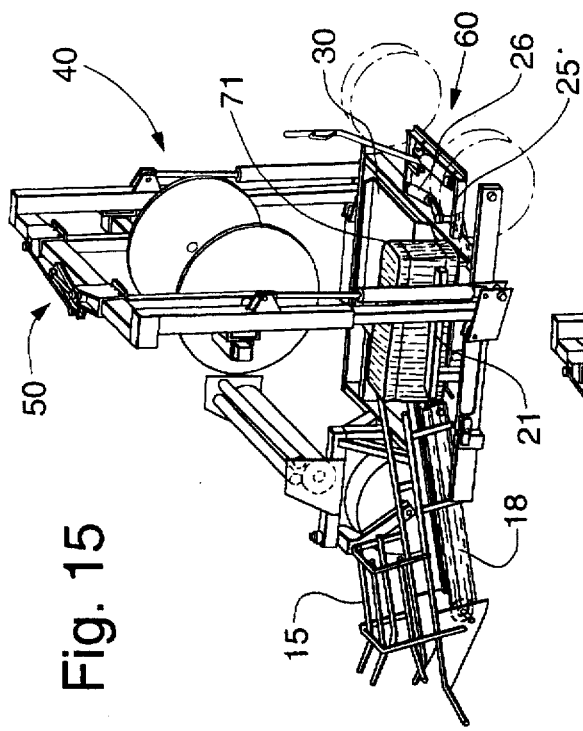

Referring now to FIGS. 14 through 31, the operation of the machine 10 and the method of wrapping small rectangular bales can best be seen. Referring first to FIG. 14, the machine 10 is starting with the loading of the first bale 71 into the pickup mechanism 15. The machine 10 is being towed behind a tractor (not shown) through connection of a draft tongue (not shown) thereto. The machine 10 is manipulated such that the first bale 71 lying on the ground has been engaged into the pickup mechanism 15 and is being elevated above the ground by the conveyor 18 and conveyed rearwardly. The clamping mechanism 40 is elevated above the table 30 through and extension of the hydraulic cylinders 57 so that bales can be loaded onto the table 30 therebeneath.

Figure 15:
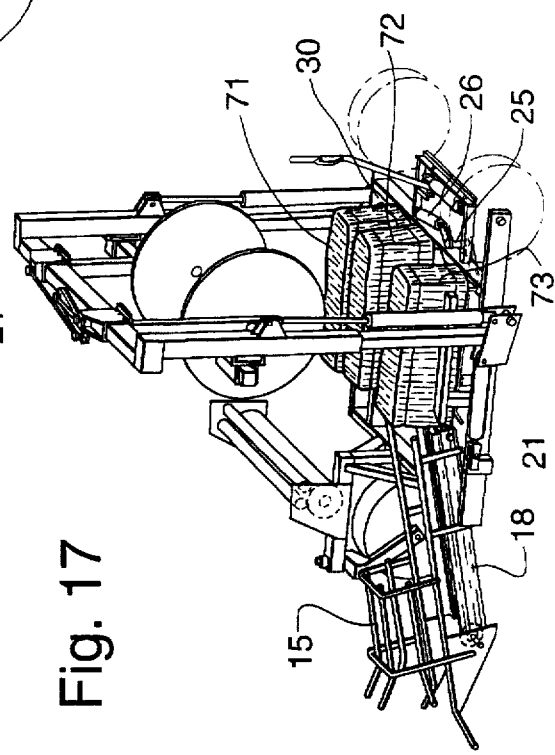

In FIG. 15, the first bale 71 has been loaded by the conveyor 18 onto the bale receiving table 19, while the machine 10 is being towed over the ground toward the next bale to be engaged. Before the second bale 72 is elevated, the bale transfer mechanism 20 has pushed the first bale 71 over onto the table 30 and the push bar 21 has been retracted to its rest position. In an automated system, an appropriate sensor (not shown) would sense that the push bar 21 is not in the rest position and prevent a second bale 72 from being loaded onto the bale receiving table 19 until the push bar 21 has returned to the rest position. In a manually operated system, the operator must be careful not to engage a bale into the pickup mechanism 15 until the push bar 21 returns to the rest position.

Figure 16:
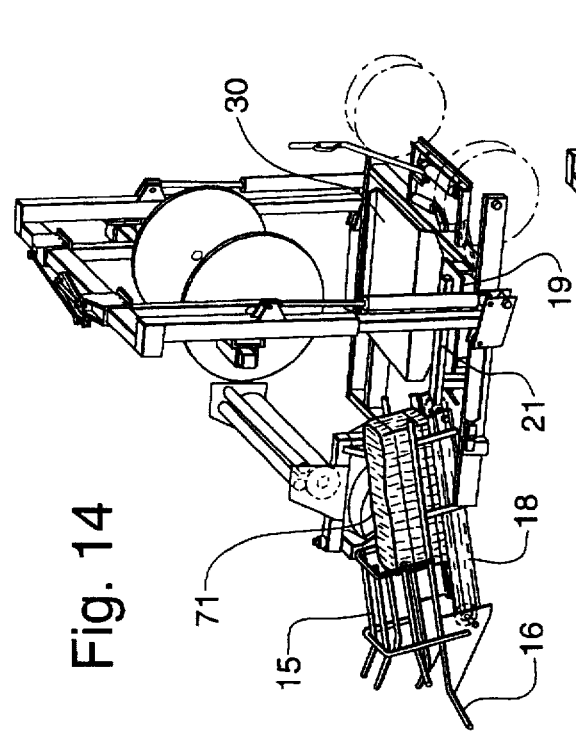
Figure 17:
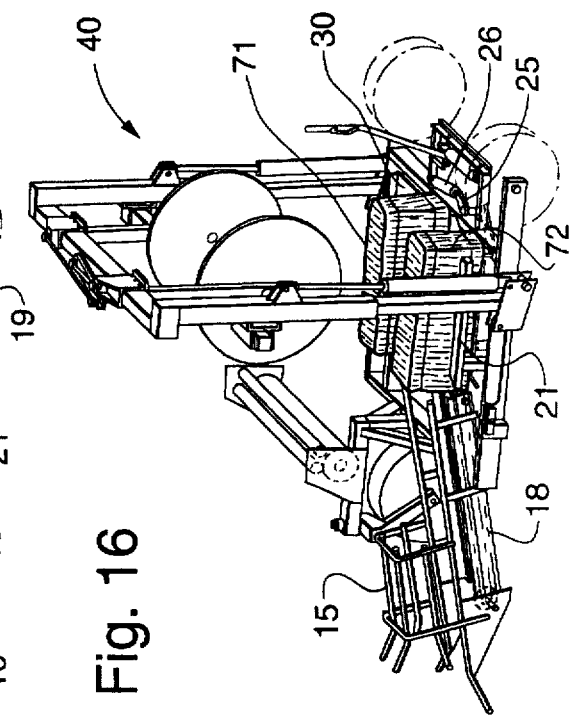

Referring now to FIG. 16, a second bale 72 has been loaded onto the bale receiving table 19 by the conveyor 18. The push bar 21 will then be moved laterally by actuation of the hydraulic cylinder 26 to move the second bale 72 onto the main portion 35 of the table 30, thereby pushing the first bale 71 further laterally toward the longitudinally extending lip 36. In FIG. 17, a third bale 73 has been similarly loaded and is on the bale receiving platform ready for lateral transfer by the bale transfer mechanism 20, which is depicted in FIG. 18. Upon the return of the push bar 21 to its rest position, the first layer of bales 75 has been completed.

To continue with the loading operation and the formation of a second layer of bales, the hydraulic cylinders 57 are retracted to collapse the telescoping portion 45b of the telescopic support members 45 onto the base portion 45a and, thereby, place the clamping disks 41 opposite of the sides of the first layer of bales 75. Extension of the hydraulic cylinder 55 draws the clamping disks 41 into engagement with the sides of the first layer of bales 75 to clamp the bales 75 between the disks 41. A subsequent extension of the hydraulic cylinders 57 raises the bale clamping mechanism 40 and, consequently, elevates the first layer of bales 75 above the table 30, as demonstrated schematically in FIG. 20. A repetition of the loading process described above with respect to FIGS. 14 through 18 places a second layer of bales 76 on the table 30 beneath the elevated first layer of bales 75.

The hydraulic cylinders 57 are again retracted until the first layer of bales 75 is placed on top of the second layer of bales 76. The hydraulic cylinder 55 is retracted to relax the bale clamping mechanism 40 so that the hydraulic cylinders 57 can then be further retracted to lower the clamping disks 41 for engagement with both the first and second layers of bales 75, 76, as shown in FIG. 21. Actuation of the hydraulic cylinders 55 and 57 effects a clamping of the two layers of bales 75, 76 and a subsequent raising of the two layers of bales 75, 76 into an elevated position above the table 30, as depicted in FIG. 21.

Again a repetition of the loading process described above with respect to FIGS. 14 through 18 places a third layer of bales 77 on the table 30 beneath the elevated two layers of bales 75, 76. The hydraulic cylinders 57 are again retracted until the first and second layers of bales 75, 76 are placed on top of the third layer of bales 77. As noted above, the hydraulic cylinder 55 is again retracted to relax the bale clamping mechanism 40 so that the hydraulic cylinders 57 can then be further retracted to lower the clamping disks 41 for engagement with all three layers of bales 75–77, as shown in FIG. 22. Actuation of the hydraulic cylinders 55 and 57 effects a clamping of the three layers of bales 75–77 and a subsequent raising of the three layers of bales 75–77 into an elevated position above the table 30, as depicted in FIG. 22.

At this point in time, the accumulated three layers of bales 75–77 forms an elevated stack of bales 79 which can now be discharged from the machine in a manner described in greater detail below. Furthermore, the stack 79 could be wrapped in a netting material, as is common with round bales, to hold the stack together before being discharged from the machine 10, or with plastic, as will be noted in the description of the wrapping process below. Assuming, however, that the stack 79 is to be silage wrapped, the first stack of bales must be hand started in the wrapping process by taking the free end of the plastic material from the supply 68 forwardly of the elevated stack 79 and tucking the loose end of the plastic between two of the bales in the topmost first layer of bales 75, as is depicted in FIG. 23.

Actuation of the hydraulic motors 49 effect a rotation of the clamping disks 41 and the elevated stack of bales 79 squeezed therebetween, thereby drawing plastic from the supply roll 68 and effecting a wrapping of plastic preferably 3 to 5 revolutions around the outer circumference of the cube-shaped stack 79, as demonstrated in FIG. 24. Once the outer circumference of the stack 79 is wrapped, the stack 79 will be substantially protected from the elements if stored properly and may be discharged from the machine 10, as described in greater detail below. Assuming again that the desire is to effect a silage wrapping of the stack 79, the hydraulic cylinders 57 are retracted to lower the stack onto the main portion 35 of the table 30, as shown in FIG. 25, whereupon the hydraulic cylinder 55 is retracted to move the clamping disks 41 outwardly away from the stack 79.

Figure 26:
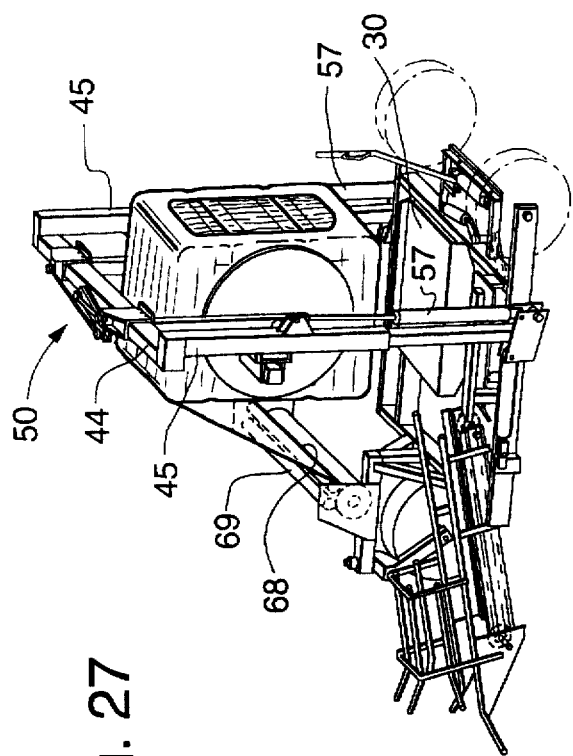
Figure 27:
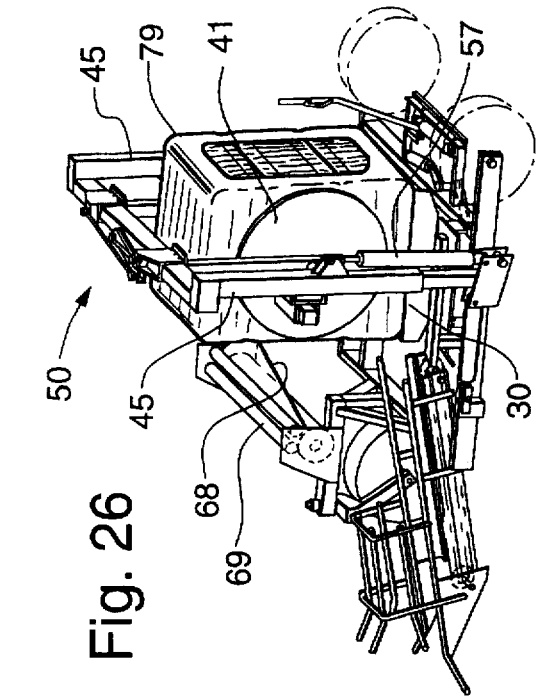

The hydraulic cylinder 38 is then actuated to cause a rotation of the table 30 approximately 90 degrees in a clockwise direction, if viewed from above, so that the now remaining unwrapped sides are facing in the fore-and-aft direction, as demonstrated in FIG. 26. The hydraulic cylinder 55 is again extended to move the clamping disks 41 inwardly into engagement with the stack 79 such that the clamping disks 41 clamp the adjacent plastic wrapped sides of the stack 79. An extension of the hydraulic cylinders 57 again raises the stack 79 above the table 30, as depicted in FIG. 27, whereupon a second actuation of the hydraulic motors 49 causes a rotation of the stack 79 to effect a plastic wrapping of the unclamped outer circumference of the stack 79.

Figure 28:
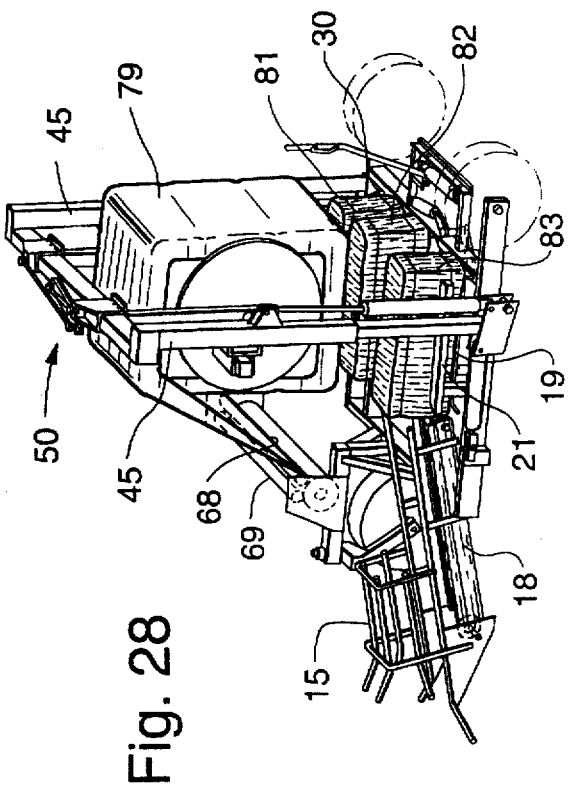

The double wrapping of the stack 79, as described above, using a plastic material that is wider than the stack of material being wrapped, particularly a stretch-type of plastic material, allows the plastic to overlap the edges of the package during the wrapping process and results in a stack of bales 79 sealed in plastic with only two seams exposed on opposite sides of the stack 79 through which air can leak to disrupt the fermenting process in the creation of silage from the forage material being wrapped. In the event the operator desires to add yet a third wrapping of the stack 79, the stack 79 can be lowered again to the table 30, unclamped and then rotated 90 degrees counterclockwise through a retraction of the hydraulic cylinder 38. A subsequent clamping and raising of the stack 79, as described above, will enable the third wrap to be placed on the stack through a duplication of the process previously described. Eventually, whether 0, 1, 2 or 3 wraps are selected, the elevated stack 79 is readied for discharge from the machine 10 to the ground, as depicted in FIG. 28.

Before discharging the readied stack of bales 79, two additional bales 81 and 82, starting a new first layer of bales 85, should be started onto the table 30 beneath the elevated stack 79. Irrespective of whether a third wrap is placed on the stack 79, the table 30 must be returned to the starting position with the ramp portion 33 facing the bale receiving platform 19 so that the bales forming the new first layer 81 can be transferred from the bale receiving table 19 onto the main table portion 35, as depicted in FIG. 28. Preferably, however, only the first two new bales 81 and 82 are transferred to the table 30, with the third new bale 83 being retained on the bale receiving platform 19 so that a gap 84 is maintained between the second and third new bales 82 and 83, which is demonstrated in FIG. 28.

The elevated stack 79 is then in proper condition for discharge from the machine 10. The hydraulic cylinders 59 are then extended to rotate the support members 45 about their respective pivotal connection with the frame 11 to lower the cross beam 44, the clamping mechanism 40 supported therefrom, and the stack of bales 79 clamped therein gently to the ground rearwardly of the table 30, as is best seen in FIG. 29, in a manner that minimizes any potential damage to the plastic wrapping material. This movement lowering the stack 79 to the ground draws additional plastic from the supply roll 98 as the stack 79 is moved away from the supply roll 68, tension in the plastic span being maintained by tensioning rollers. As depicted in FIG. 30, the hydraulic cylinder 64 is then actuated to move the restart arm 62 from its rest position to an operative position which pulls the span of plastic extending between the supply roll 68 and the stack 79 downwardly into the gap 84 between the second and third new bales 82, 83.

The next step is to capture the span of plastic between the second and third new bales 82, 83 by actuating the hydraulic cylinder 26 to transfer the third new bale 83 onto the main table portion 35 and close the gap 84. A subsequent release of the bale clamping mechanism 40 through a retraction of the hydraulic cylinder 55 and a raising of the support members 45 and the cross beam 44 to the original vertical position through a retraction of the hydraulic cylinders 59, places the stack 79 on the ground rearwardly of the machine 10. Movement of the machine 10 away from the stack 79 will cause a stretching of the plastic span between the stack 79 and the capturing of the plastic span between the second and third new bales 82, 83 until the plastic tears.

The utilization of a stress inducing member 63 affixed to the restart arm 62 that engages the plastic span when the restart arm 62 is moved from the rest position to the operative position will induce a weak spot in the plastic span and substantially assure that the tearing of the plastic span will occur beneath the restart arm 62. Alternatively, a cutting mechanism (not shown) could be utilized to sever the plastic span as desired. A return of the restart arm to the rest position through a retraction of the hydraulic cylinder 64 places the machine 10 in the condition shown in FIG. 31 with the new first layer 85 already positioned on the table 30. Operation, as described above, to clamp and elevate the new first layer 85 for subsequent second and third layers (not shown) readies a new stack for discharge from the machine 10. The primary difference between the second stack and the first stack 79 is that the plastic wrap is already engaged in the first layer 85 and does not require a manual operation to start the wrapping process.

One skilled in the art will realize that the wrapping process is not dependent upon the accumulation of three layers, as either one or two layers, or even a partial layer could be wrapped in plastic and discharged from the machine 10 in a manner very similar to that described above. Automation of the wrapping and/or discharge process can be easily provided, preferably through a microprocessor that is operable to count the number of revolutions and the number of wraps according to a pre-programmed selection, and sequentially actuate the hydraulic cylinders 26, 38, 55, 57, 59 and 64 and the hydraulic motors 17 and 49 in the proper manner to accomplish the desired tasks.

One skilled in the art will also recognize that this machine 10 could be utilized to retrieve stacks of bales, whether wrapped or unwrapped, for transport from one location to another. The retrievable process is substantially a reversal of the aforementioned discharge process. To retrieve a stack of bales, the machine must be backed into position in front of the stack of bales so that the lowering of the support members 45 and cross beam 44 encircles the stack and places the clamping mechanism 40 on opposing sides of the stack to be retrieved. An actuation of the hydraulic cylinder 55 engages the clamping disks 41 with the sides of the stack. A subsequent retraction of the hydraulic cylinders 59 will lift the stack off the ground into an elevated position above the table 30, whereupon the stack can be lowered onto the table 30 for transport to a remote location to be discharged from the machine by elevating the stack above the table 30 and lowering the stack to the ground behind the machine 10, substantially as described above.

By properly sizing the table 30, the machine 10 can be used to retrieve and wrap both large and medium sized rectangular bales and round bales, as well. The retrieval process is precisely as described above to retrieve a stack of small rectangular bales. The wrapping process is identical to that described above through a rotation of the clamping disks 41 and a rotation of the table 30 to achieve a second, and if desirable a third, wrapping of plastic around the bale, except that the starting of the wrapping process would require a manual operation to capture the free end of the plastic.

An alternative configuration of the disclosed machine would be to connect the machine to a hay baler to allow the machine to receive the bales of hay (or other forage material) directly therefrom. One skilled in the art will readily realize that in such a configuration the pickup mechanism 15 would not be needed, but that the remaining apparatus and operation of the machine would be essentially the same as described above. One skilled in the art would also recognize that the baling process would necessarily be slowed as the wrapping sequence described above would take a greater period of time than that required for the formation of a bale of hay, thereby requiring that the operation of the baler be interrupted while the wrapping process is being completed.

This machine 10 provides an apparatus for silage wrapping small, medium and large rectangular bales of forage material. Even if the wrapping of plastic, or even netting material, extends only to a first wrapping around the circumference of the package being wrapped, rain damage is minimized. Labor intensive handling of small rectangular bales is reduced as is the requirement of a roofed structure to protect the small rectangular bales, since plastic wrapped stacks of small rectangular bales can be stored outside with little risk of loss. As opposed to forage material packaged in round bales, small rectangular bales are easy to feed to the livestock and are more compatible with total mix ration feed mixers. Because of the relative simplicity of the apparatus, the cost should enable even small farmers to purchase such a machine which will have a large number of uses. Flexibility in usage is a primary advantage of this machine.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description may be employed in other embodiments without departing from the scope of the invention. Accordingly, the following claims are intended to protect the invention broadly as well as in the specific form shown.

Having thus described the invention, I claim:

1. Apparatus for wrapping bales of crop material with a wrapping material comprising:

a mobile frame adapted for movement over the ground;

means supported on said frame for receiving a package of crop material to be wrapped and for supporting said package of crop material above the ground, said package of crop material having an outer peripheral surface;

lift means engageable with said package of crop material to elevate said package of crop material above said means for receiving for rotation thereof about an axis of rotation, said lift means including clamping means operable to engage said package of crop material without penetrating said outer peripheral surface thereof;

means for rotating said package of crop material about said axis of rotation while being suspended by said lift means;

means for providing a supply of wrapping material to said elevated package of crop material as said package of crop material is rotated about said axis of rotation to create a wrapped package of crop material; and means for discharging said wrapped package of crop material from said apparatus.

2. The apparatus of claim 1 wherein said lift means comprises:

a tower mechanism supported by said frame above said means for receiving, said tower mechanism including a pair of telescopic members;

said clamping means being mounted on said tower mechanism for selectively engaging said package of crop material for support thereof above said receiving means; and first power means for operably powering the telescopic movement of said tower mechanism.

3. The apparatus of claim 2 wherein said clamping means includes:

a pair of clamping members supported respectively on said telescopic members and being movable toward and away from each other; and second power means for operably powering the movement of said clamping members.

4. The apparatus of claim 3 wherein said clamping members are rotatably supported for rotation about said axis of rotation and are operably connected to said means for rotating to effect rotation of said package of crop material.

5. The apparatus of claim 4 wherein said telescopic members are pivotally supported on said frame for movement between an upright position and a lowered position, said ejecting means including third power means for operably powering the selective pivotal movement of said telescopic members between said upright and lowered positions.

6. The apparatus of claim 5 further comprising:

means for turning said package of crop material approximately 90 degrees to orient said axis of rotation of said package of crop material perpendicularly to said axis of rotation of said lift means.

7. The apparatus of claim 6 wherein said receiving means includes a receiving table positioned between said telescopic members, said receiving table being pivotally mounted on said frame, said means for turning including fourth power means for operatively powering the pivotal movement of said receiving table for selectively orienting said package of crop material between perpendicular orientations.

8. The apparatus of claim 7 wherein said receiving means further includes a pickup mechanism operable to elevate individual bales of crop material onto said receiving table to form said package of crop material.

9. The apparatus of claim 8 wherein said package of crop material is formed from several layers of individual bales, each said layer of bales being elevated above said receiving table by said lift means to permit the formation of a subsequent layer of individual bales below said elevated layer of bales until said package of crop material is formed.

10. Apparatus for wrapping a package of crop material with a wrapping material comprising:

a wheeled frame adapted for movement over the ground;

a receiving table pivotally supported on said frame for receiving said package of crop material to be wrapped, said receiving table being pivotally movable between first and second pivoted positions;

a tower mechanism supported by said frame above said receiving table and including a pair of telescopic members pivotally supported on said frame for movement between an upright position and a lowered position;

a clamping member mounted on each said telescopic member for movement toward and away from each other for selectively engaging said package of crop material for support thereof above said receiving table, said clamping members being rotatable about an axis of rotation to permit said package of crop material when elevated to be rotated about said axis of rotation;

means for providing a supply of wrapping material to said elevated package of crop material as said package of crop material is rotated about said axis of rotation; and power means for operatively powering the reciprocal movement of said clamping members, the rotational movement of said clamping members, the pivotal movement of said receiving table, the telescopic movement of said tower mechanism, and the pivotal movement of said telescopic members.

11. The apparatus of claim 10 further comprising:

a pickup mechanism operable to elevate individual bales of crop material onto said receiving table to form said package of crop material.

12. The apparatus of claim 11 wherein said package of crop material is formed from multiple layers of individual bales, each said layer of bales being elevated above said receiving table by said clamping members and said telescopic members to permit the formation of a subsequent layer of individual bales below said elevated layer of bales until said package of crop material is formed.

13. The apparatus of claim 12 wherein said power means includes:

a first hydraulic actuator interconnecting said telescopic members and said frame to effect the telescopic movement of said tower mechanism;

a second hydraulic actuator operably interconnecting said clamping members for effecting the movement of said clamping members toward and away from each other;

a third hydraulic actuator interconnecting said telescopic members and said frame for operably powering the selective pivotal movement of said telescopic members between said upright and lowered positions;

a fourth hydraulic actuator interconnecting said receiving table and said frame for powering the pivotal movement of said receiving table to orient said package of crop material between said first and second positions; and a hydraulic motor for operably powering the rotation of said clamping members to rotate said package of crop material about said axis of rotation.

14. The apparatus of claim 13 wherein said clamping members are interconnected by an overcenter linkage operably associated with said second hydraulic actuator.

15. A method of wrapping a package of crop material with wrapping material on a machine having a receiving table comprising the steps of:

acquiring said package of crop material on said receiving table;

clamping said package of crop material by clamping members and elevating said clamped package of crop material above said receiving table;

introducing said wrapping material to said package of crop material;

rotating said package of crop material about a first axis of rotation for at least one revolution while said package of crop material is elevated to wrap said wrapping material circumferentially around said package of crop material as said package of crop material is rotated about said axis of rotation to provide a wrapped surface on said package of crop material;

releasing said package of crop material onto said receiving table;

turning said package of crop material approximately 90 degrees such that said wrapped surface is adjacent said clamping members;

re-clamping said package of crop material by said clamping members engaging said wrapped surface and re-elevating said package of crop material above said receiving table; and rotating said package of crop material a second time for at least one revolution to wrap said wrapping material circumferentially around said package of crop material, whereby said wrapping material extends substantially around the entire outer surface of said package of crop material to form a wrapped package of crop material, and discharging said wrapped package of crop material from said machine.

16. The method of claim 15 wherein said clamping and said re-clamping steps utilize clamping members that do not penetrate the package of crop material, said step of rotating said package of crop material a second time effectively placing said wrapping material around said package of crop material about a second axis of rotation oriented approximately perpendicularly to said first axis of rotation due to the operation of said turning step.

17. The method of claim 16 wherein said clamping and said re-clamping steps include the steps of:
   positioning a pair of clamping members on opposing respective sides of said package of crop material; and
   moving said clamping members toward each other until said clamping members engage said package of crop material with sufficient clamping force to be able to support said package of crop material above said receiving table.

18. The method of claim 17 wherein said elevating step includes the step of:
   raising said clamping members vertically relative to said receiving table by extending telescopic members supporting said clamping members.

19. The method of claim 18 wherein said ejecting step includes the steps of:
   pivoting said telescopic members from a raised, generally upright position to a lowered discharge position;
   severing said wrapping material;
   subsequently releasing said clamping members from said wrapped package of crop material; and
   re-pivoting said telescopic members to return said telescopic members to said upright position.

20. The method of claim 19 wherein said acquiring step includes the steps of:
   engaging individual bales of crop material on the ground by a pick-up mechanism and moving each said individual bale of crop material onto said receiving table to form a layer of bales of crop material;
   clamping said layer of said bales of crop material with said clamping members and elevating said layer of bales of crop material above said receiving table;
   repeating said engaging and moving steps to create a subsequent layer of bales of crop material beneath said elevated layer of bales of crop material;
   then subsequently lowering said elevated layer of bales of crop material onto the layer of bales of crop material positioned on said receiving table and releasing said elevated layer of bales of crop material to form a multiple layers of bales of crop material;
   clamping said multiple layers of bales of crop material with said clamping members and elevating said multiple layers of bales of crop material above said receiving table; and
   repeating said engaging and moving steps to create a subsequent layer of bales of crop material beneath said elevated layer of bales of crop material and said subsequent lowering and releasing steps, and said subsequent clamping and elevating steps, as necessary, until a package of crop material is formed on said receiving table.

21. The method of claim 19 wherein, said acquiring step includes the step of:
   receiving individual bales of crop material directly from an apparatus operable to form said individual bales of crop material
   clamping said layer of said bales of crop material with said clamping members and elevating said layer of bales of crop material above said receiving table;
   repeating said receiving and moving steps to create a subsequent layer of bales of crop material beneath said elevated layer of bales of crop material;
   then subsequently lowering said elevated layer of bales of crop material onto the layer of bales of crop material positioned on said receiving table and releasing said elevated layer of bales of crop material to form multiple layers of bales of crop material;
   clamping said multiple layers of bales of corp material with said clamping members and elevating said multiple layers of bales of crop material above said receiving table; and
   repeating said receiving and moving steps to create a subsequent layer of bales of crop material beneath said elevated layer of bales of crop material and said subsequent lowering and releasing steps, and said subsequent clamping and elevating steps, as necessary, until a package of corp material is formed on said receiving table.

22. The method of claim 20 wherein said introducing step includes the step of:
   fixing a loose end of said wrapping material between individual bales of crop material.

23. The method of claim 22 wherein said ejecting step follows said step of forming a layer of individual bales of crop material on said receiving table beneath said wrapped package of crop material, and further comprises the step of:
   prior to said severing step, sweeping said wrapping material between individual bales of crop material formed on said receiving table; and
   subsequently moving said individual bales of crop material on said receiving table to engage said wrapping material therebetween prior to said severing step.

24. A method of wrapping a package of crop material with wrapping material on a machine having a receiving table comprising the steps of:
   acquiring said package of crop material on said receiving table;
   suspending said package of crop material above said receiving table in a first orientation;
   introducing said wrapping material to said package of crop material;
   rotating said package of crop material about a first axis of rotation for at least one revolution while said package of crop material is suspended to wrap said wrapping material circumferentially around a first outer surface of said package of crop material as said package of crop material is rotated about said axis of rotation, leaving a remaining second outer surface of said package of crop material devoid of said wrapping material;
   releasing said package of crop material onto said receiving table;
   turning said package of crop material to re-orient said first outer surface approximately 90 degrees to said first orientation;
   re-suspending said package of crop material above said receiving table; and
   rotating said package of crop material a second time for at least one revolution to wrap said wrapping material circumferentially around said second outer surface of said package of crop material, whereby said wrapping material extends substantially around the entire outer surface of said package of crop material to form a wrapped package of crop material; and
   discharging said wrapped package of crop material from said machine.

* * * * *